(12) United States Patent
Massanek et al.

(10) Patent No.: US 10,929,876 B1
(45) Date of Patent: Feb. 23, 2021

(54) METHOD, APPARATUS, AND COMPUTER PROGRAM PRODUCT FOR ASCERTAINING A DEMAND OF PROMOTIONS

(71) Applicant: Groupon, Inc., Chicago, IL (US)

(72) Inventors: Geoff Massanek, Chicago, IL (US); Karen Wei, Chicago, IL (US); Ethan Gunderson, Chicago, IL (US); Jerry Richard Vos, Chicago, IL (US); Erik Benoist, Chicago, IL (US)

(73) Assignee: Groupon, Inc., Chicago, IL (US)

( * ) Notice: Subject to any disclaimer, the term of this patent is extended or adjusted under 35 U.S.C. 154(b) by 802 days.

(21) Appl. No.: 14/103,256

(22) Filed: Dec. 11, 2013

(51) Int. Cl.
*G06Q 30/02* (2012.01)

(52) U.S. Cl.
CPC .............. *G06Q 30/0246* (2013.01)

(58) Field of Classification Search
CPC ...................... G06Q 30/0207–0277
See application file for complete search history.

(56) References Cited

U.S. PATENT DOCUMENTS

| | | | | |
|---|---|---|---|---|
| 2005/0245241 A1* | 11/2005 | Durand | .................. | G06Q 30/02 455/414.1 |
| 2008/0249840 A1* | 10/2008 | Koether | ................. | G06Q 30/02 705/7.31 |
| 2011/0191181 A1* | 8/2011 | Blackhurst | ......... | G06Q 30/0269 705/14.53 |
| 2011/0196746 A1* | 8/2011 | Tang | ...................... | G06Q 30/02 705/14.71 |
| 2013/0110639 A1* | 5/2013 | So | ........................... | G06Q 30/02 705/14.66 |
| 2013/0218803 A1* | 8/2013 | Whittle | .............. | G06Q 30/0282 705/347 |
| 2014/0089092 A1* | 3/2014 | Kilmer | ............... | G06Q 30/0269 705/14.58 |
| 2014/0180865 A1* | 6/2014 | Argue | ................ | G06Q 30/0633 705/26.7 |
| 2014/0379513 A1* | 12/2014 | Bidgoli | .............. | G06Q 30/0207 705/26.4 |

OTHER PUBLICATIONS

Denegri-Knott et al., "Redistributed consumer desire in digital virtual worlds of consumption", Journal of Marketing Management, 2013, vol. 29, Nos. 13-14, 1561-1579. (Year: 2013).*

* cited by examiner

*Primary Examiner* — Christopher B Tokarczyk
(74) *Attorney, Agent, or Firm* — Alston & Bird LLP

(57) ABSTRACT

A method, apparatus and computer program product are provided herein for ascertaining a demand of promotions. An example method comprises receiving, from one or more consumers, at least one consumer request for at least one of one or more requested promotions or one or more requested providers, generating an aggregated list of the at least one of the one or more requested promotions or the one or more requested providers, ranking the aggregated list of the at least one consumer request, and causing one or more ranked lists to be distributed to at least one sales resource.

17 Claims, 9 Drawing Sheets

METHOD, APPARATUS, AND COMPUTER PROGRAM PRODUCT FOR ASCERTAINING A DEMAND OF PROMOTIONS

FIELD

Example embodiments of the present invention relate generally to promotion management and, more particularly, to a method, apparatus, and computer program product for ascertaining a demand of promotions.

BACKGROUND

Applicant has discovered problems with existing methods and systems for promotional demand management. Through applied effort, ingenuity, and innovation, Applicant has solved many of these identified problems by developing a solution that is embodied by the present invention and described in detail below.

BRIEF SUMMARY

A method, apparatus, and computer program product are therefore provided for ascertaining a demand of promotions requested by a consumer via a promotional system.

A method for utilizing a consumer request to ascertain promotional demand is provided, the method comprising receiving, from one or more consumers, at least one consumer request for at least one of one or more requested promotions or one or more requested providers, generating an aggregated list of the at least one of the one or more requested promotions or the one or more requested providers, ranking the aggregated list of the at least one consumer request, and causing one or more ranked lists to be distributed to at least one sales resource, wherein the one or more ranked lists provide an indication of a demand for the one or more requested promotions or the one or more requested providers.

In some embodiments, the method further comprises indicating to, at least one consumer, at least one of a promotion or a provider in response to a request, and updating a consumer demand list with the consumer request.

In some embodiments, the method further includes indicating to the consumer, the consumer request is associated with the consumer demand list, via a notification, wherein the notification is defined by at least one of a communication, a text message, a link, an icon, or a button.

In some embodiments, the request includes at least one of a search or a browser selection.

In some embodiments, the at least one of the one or more requested promotions or the one or more requested providers is not returned in response to the request.

In some embodiments, the at least one of the one or more requested promotions or the one or more requested providers is not returned in response to the request and the one or more consumers is prompted to add the one or more requested promotions or the one or more requested providers to the consumer demand list.

In some embodiments, the at least one of the one or more requested promotions or the one or more requested providers is added to a consumer demand list via at least one of a link, a button, an icon, a request form, a communication, or a text.

In some embodiments, the at least one of the one or more requested promotions or the one or more requested providers is added to a consumer demand list via a thumbs up icon In some embodiments, the one or more requested promotions is defined by at least one of a category, a sub-category, or a service, the category, the sub-category, or the service identifying a service or product, a price, and at least one location.

In some embodiments, the one or more requested providers is defined by at least one of a category or a sub-category, the category or the sub-category identifying a provider and at least one location.

In some embodiments, generating the aggregated list of the at least one of the one or more requested promotions or the one or more requested providers comprises receiving the at least one of the one or more requested promotions or the one or more requested providers associated with the consumer request and aggregating the at least one of the one or more requested promotions or the one or more requested providers.

In some embodiments, ranking the aggregated list of the at least one consumer request comprises assigning a promotion score to each of the one or more requested promotions, the promotion score comprising at least one of a promotion availability score, consumer request score, or a seasonality score, assigning a provider score to each of the one or more requested providers, the provider score comprising at least one of a review score, a competitor promotion score, a prior performance of related providers score, or a geographic score, and generating one or more ranked lists.

In some embodiments, generating the one or more ranked lists comprises calculating the promotion score or the provider score assigned to each of the one or more requested promotions or the one or more requested providers, and ranking each of the at least one of the one or more requested promotions or the one or more requested providers.

In some embodiments, causing the one or more ranked lists to be distributed to the at least one sales resource comprises receiving the one or more ranked lists, wherein the one or more ranked lists comprises the at least one of the one or more requested promotions or the one or more requested providers, allocating the one or more ranked lists to at least one first sales resource, and deallocating the one or more ranked lists from the at least one first sales resource.

In some embodiments, causing the one or more ranked lists to be distributed to the at least one sales resource further comprises reallocating the one or more ranked lists to a second sales resource.

In some embodiments, the one or more requested providers currently does not offer a promotion.

In some embodiments, the one or more requested promotions is unavailable.

In some embodiments, the one or more ranked lists is dynamically allocated to the at least one sales resource based on at least one of current resources, need, or business objectives.

In some embodiments, the one or more ranked lists is dynamically modified based on at least one of a current resource, a need, or a business objectives.

An apparatus for utilizing a consumer request to ascertain promotional demand, the apparatus comprising at least one processor coupled to at least one memory including computer program code, the at least one memory and the computer program code configured to, with the processor, cause the processor to at least receive, from one or more consumers, at least one consumer request for at least one of one or more requested promotions or one or more requested providers, generate an aggregated list of the at least one of the one or more requested promotions or the one or more requested providers, rank the aggregated list of the at least one consumer request, and cause one or more ranked lists to be distributed to at least one sales resource, wherein the one or more ranked lists provide an indication of a demand for the one or more requested promotions or the one or more requested providers.

A computer program product for utilizing a consumer request to ascertain promotional demand, the computer program product comprising at least one non-transitory computer-readable storage medium having computer-executable program code instructions stored therein, the computer-executable program code instructions comprising program code instructions to receive, from one or more consumers, at least one consumer request for at least one of one or more requested promotions or one or more requested providers, generate an aggregated list of the at least one of the one or more requested promotions or the one or more requested providers, rank the aggregated list of the at least one consumer request, and cause one or more ranked lists to be distributed to at least one sales resource, wherein the one or more ranked lists provide an indication of a demand for the one or more requested promotions or the one or more requested providers.

Additional features and advantages of the present invention will be set forth in portion in the description which follows, and in portion will be obvious from the description, or may be learned by practice of the invention. The features and advantages of the invention will be realized and attained by means of the elements and combinations particularly pointed out in the appended claims.

It is to be understood that both the foregoing general description and the following detailed description are exemplary and explanatory only and are not restrictive of the invention as claimed.

The above summary is provided merely for purposes of summarizing some example embodiments to provide a basic understanding of some aspects of the invention. Accordingly, it will be appreciated that the above-described embodiments are merely examples and should not be construed to narrow the scope of the invention in any way. It will be appreciated that the scope of the invention encompasses many potential embodiments in addition to those here summarized, some of which will be further described below.

BRIEF DESCRIPTION OF THE DRAWINGS

Having therefore described certain example embodiments of the present disclosure in general terms, reference will now be made to the accompanying drawings, which are not necessarily drawn to scale, and wherein.

DETAILED DESCRIPTION OF VARIOUS EMBODIMENTS

Figure 1:
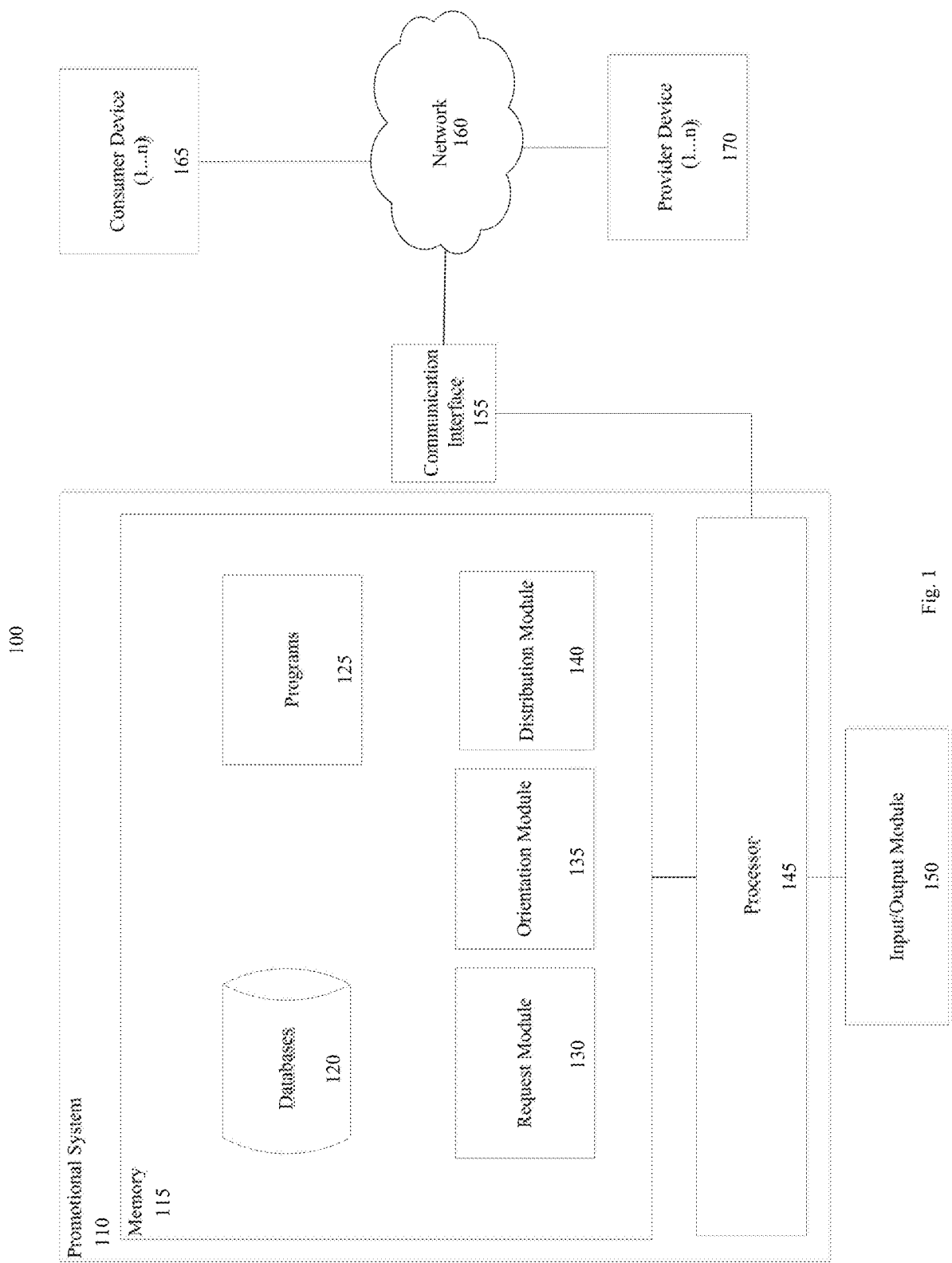
FIG. 1 is a block diagram of a promotional data system according to an example embodiment.

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein. Rather, these embodiments are provided so that this disclosure will satisfy applicable legal requirements. Like numbers refer to like elements throughout.

As used herein, the terms "data," "content," "information" and similar terms may be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, it will be appreciated that the data may be received directly from the other computing device or may be received indirectly via one or more intermediary computing devices, such as, for example, one or more servers, relays, routers, network access points, base stations, and/or the like. Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, and/or the like.

As used herein, the term "promotion" may include, but is not limited to, any type of offered, presented or otherwise indicated reward, discount, coupon, credit, deal, incentive, discount, media or the like that is indicative of a promotional value or the like that upon purchase or acceptance results in the issuance of a promotion that may be used toward at least a portion of the purchase of particular goods, services and/or experiences defined by the promotion. For example, using a massage company as the example provider, a promotion may be $25 for $50 toward a massage.

In some embodiments, a promotional system may include a promotion that may not be currently available for purchase along with the one or more promotions that are currently available. For example, a promotion for "Half-off Italian Dinner from $15," that is currently out of stock may be requested via a promotional system, such as the promotion and marketing system discussed herein.

As used herein, the term "provider" may include, but is not limited to, a merchant, business owner, consigner, shopkeeper, tradesperson, vender, operator, entrepreneur, agent, dealer, organization or the like that is in the business of providing a good, service or experience to a consumer, facilitating the provision of a good, service or experience to a consumer and/or otherwise operating in the stream of commerce. One example provider may be a massage company that sells massages for use by a person who engages in wellness activities.

In some embodiments, a promotional system may include a provider that currently may not offer a promotion for purchase along with the one or more providers that are currently offering promotions. For example, a provider may be a sushi restaurant that currently does not offer promotions for purchase. A consumer may request via a promotional system to receive promotions from the sushi restaurant.

As used herein, the term "impression" may include a communication, a display, or other perceived indication, such as a flyer, print media, e-mail, text message, application alert, mobile applications, other type of electronic interface or distribution channel and/or the like, of one or more promotions. For example, and using the aforementioned massage company as the example provider, an e-mail communication sent to consumers that indicates the availability of a promotion of $25 for $50 toward a massage.

As used herein, the term "promotion and marketing service" may include a service that is accessible via one or more computing devices and is operable to provide example promotion and/or marketing services on behalf of one or more providers that are offering one or more promotions that are redeemable for goods, services, experiences and/or the like. In some examples, the promotion and marketing service may take the form of a redemption authority, a payment processor, a rewards provider, an entity in a financial network, a promoter, an agent and/or the like. As such, the service is, in some example embodiments, configured to present one or more promotions via one or more impressions, accept payments for promotions from consumers, issue promotions upon acceptance of an offer, participate in redemption, generate rewards, provide a point of sale device or service, issue payments to providers and/or or otherwise participate in the exchange of goods, services or experiences for currency, value and/or the like.

As used herein, the term "consumer request" may include a request entered via a promotional system by a consumer to purchase a promotion, receive promotions from a provider, and/or the like. For example, a consumer request may be for a promotion, such as $25 toward the purchase of a $50 massage, or to receive promotions from a provider, such as a sushi restaurant that currently does not offer promotions via the promotional system. In some examples, a consumer request may take the form of a an indication to add to a requested or otherwise interesting promotion or provider wishlist, the wishlist being a listing of requested promotions that a user or consumer may be interested in purchasing, or a listing of one or more providers that a consumer may be watching or otherwise interested in an instance in which the one or more providers offer a promotion.

Overview

The methods, apparatus and computer program products described herein are operable to manage or otherwise ascertain demand in a promotional system by implementing and/or otherwise executing a request module, orientation module, distribution module, and/or the like. A promotional and marketing system, such as the promotional system described herein, may be configured to receive requests, via the request module, from a source, such as a consumer (e.g., a client, customer, purchaser, shopper, user or the like who may be in the position to or does exchange value for one or more promotions). For example, an individual who is interested in purchasing a future massage from a massage company may add a promotion for a massage to a consumer demand list (e.g. a wishlist) via the request module.

As used herein, the term "consumer demand list" may include an enumeration, list, inventory, index, directory, record, catalog, and/or the like of one or more promotions, providers, and/or the like that are of interest to the particular consumer. The consumer may enter a consumer request for a promotion, provider, and/or the like, such as via the request module, which may result in an update to a consumer demand list. In some embodiments, a consumer may receive notifications via the promotional system, such as, when the promotion becomes available for purchase, the provider offers a promotion for purchase, and/or the like. For example, using the aforementioned sushi restaurant example, the promotional system may then update a consumer demand list when the sushi restaurant offers a promotion for purchase. Further, a consumer may receive notification when the sushi restaurant offers a promotion for purchase.

Such received consumer requests may also be used by the promotional system, via the orientation module, to generate an aggregated list of consumer requests across the promotion and marketing service, in a given region, in a hyper local area and/or the like. In one example embodiment, promotional systems structured as discussed herein are configured to generate an aggregated list of requested promotions and/or requested providers of such received requested promotions and/or requested providers. As such, and by aggregating the various consumer requests, the promotion system may ascertain demand for particular providers, promotions and/or both.

The "aggregated list" may include a group of one or more categories, sub-categories, services, etc. Categories, sub-categories, and/or services may include food, dining, health and beauty, entertainment, location, consumer interest, providers, and/or the like. For example, an aggregated list of 15 massage promotions may be defined having a category "health and beauty," sub-category "spa," service "30 minute massage," service "90 minute massage," and/or the like. Thus, in some examples, demand may be ascertained for one or more categories, sub-categories, services, experiences, goods or the like.

In further examples, such aggregated lists may then be ranked by the promotional system via the orientation module, such as, for example, to determine the items on the list that have a higher demand when compared to other items on the list. In another embodiment, the promotional system may generate a ranked list of requested promotions and/or requested providers. As used herein, the term "ranked list" may include a list of relationships as between one or more items such that, for any two items, one item is ranked higher than the other, lower than the other, equal to the other, etc. Further, a ranked list including consumer requests may provide an example ordering in which sales calls may be made, consumer interest may be gaged, and/or the like.

In some examples, a ranked list may include assigned promotion scores and/or provider scores. A "promotion score" may include a score assigned to a promotion based on promotion availability, consumer requests, seasonality, and/or the like. The term "provider score" may include a review score, a competitor promotion score, a prior performance of related providers score, a geographic score, and/or the like. Referring to the massage example above, service "90 minute massage" may be requested by 10 consumers including an assignment of "1" to each requested promotion yielding a promotion score of 10. Service "30 minute massage" may be requested by 5 consumers including an assignment of "1" to each requested promotion yielding a promotion score of 5. The "30 minute massage" with a promotion score of 5 may be ranked lower than the "90 minute massage" with the promotion score of 10 on the ranked list.

In an example embodiment, the aggregated lists, ranked lists or the like may then be programmatically distributed via the distribution module to at least one sales resource (e.g., a sales person, group, business, and/or the like engaged in producing sales). In some examples, the distribution may be dynamically allocated and/or modified based on current resources, need, business objectives, and/or the like. In some examples, determination of demand, adjustment of the demand according to supply and the assigning of one or more sales leads are further discussed in U.S. patent application Ser. No. 13/803,445 filed on Mar. 14, 2013, which is incorporated by reference as if set forth in its entirety herein.

In yet another embodiment, distributing the ranked list may include allocating, deallocating, reallocating, dividing, and/or the like at least one ranked list to a sales resource. A ranked list may be deallocated should the requests for promotions and/or providers be supplied, the promotion becomes available for purchase, demand changes, etc. Additionally, or alternatively, a rank list may be reallocated if, for example, the ranked list resides in a queue for a period of time, a resource is unable to get the consumer requests filled, a resource is unavailable, etc. For example, the ranked list of massages may be allocated and, thereby, displayed in an application to be accessed by Resource A. Resource A may use the ranked list to demonstrate to a provider a demand for the provider's products, services, or the like among identified consumers. Alternatively, or additionally, Resource A may connect with a provider associated with the requested promotion to fill one or more consumer requests for a promotion. The ranked list may be deallocated from Resource A should consumer requests for a promotion, such as a "90 minute massage," become available for purchase. Further, the ranked list may be reallocated from Resource A to Resource B when Resource A is unable to get the consumer requests filled.

As described in greater detail below, various example embodiments of the invention provide solutions for each of the above scenarios that utilize consumer requests as signals to ascertain demand and/or otherwise inform promotional systems.

Example System Architecture

Disclosed are various systems, methods, apparatus, and computer program products for utilizing a consumer request as a signal to manage, or otherwise ascertain, demand in a promotional and marketing system, such as promotional system 110. Regarding promotional system 110, FIG. 1 depicts an example schematic block diagram of circuitry, some or all of which may be included in an example embodiment. System 100 may include one or more devices and sub-systems that are configured to implement some of the example embodiments discussed herein. For example, system 100 may include promotional system 110, which may include, for example, memory 115, a processor 145, communication interface 155, and input/output module 150. Memory 115 may include request module 130, orientation module 135, and/or distribution module 140. As referred to herein, "module" includes hardware, software and/or firmware configured to perform one or more particular functions. In this regard, the means of the device's circuitry as described herein may be embodied as, for example, circuitry, hardware elements (e.g., a suitably programmed processor, combinational logic circuit, and/or the like), a computer program product comprising computer-readable program instructions stored on a non-transitory computer-readable medium (e.g., memory 115) that is executable by a suitably configured processing device (e.g., processor 145), or some combination thereof.

The promotional system 110 may comprise one or more distinct computing systems/devices and may span distributed locations. In other example embodiments, a pre-processing module or other module that requires heavy computational load may be configured to perform that computational load and thus may be on a remote device or server. Furthermore, each block shown may represent one or more such blocks as appropriate to a specific example embodiment. In some cases one or more of the blocks may be combined with other blocks.

Processor 145 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an application specific integrated circuit (ASIC) or field programmable gate array (FPGA), or some combination thereof. Accordingly, although illustrated in FIG. 1 as a single processor, in some embodiments, processor 145 comprises a plurality of processors. The plurality of processors may be embodied on a single computing device or may be distributed across a plurality of computing devices collectively. The plurality of processors may be in operative communication with each other and may collectively be configured to perform one or more functionalities of a promotional system as described herein. In an example embodiment, processor 145 may be configured to execute instructions stored in memory 115 or otherwise accessible to processor 145. These instructions, when executed by processor 145, may cause promotional system 110 to perform one or more of the functionalities as described herein.

Whether configured by hardware, firmware/software methods, or by a combination thereof, processor 145 may comprise an entity capable of performing operations according to embodiments of the present invention while configured accordingly. Thus, for example, when processor 145 is embodied as an ASIC, FPGA or the like, processor 145 may comprise specifically configured hardware for conducting one or more operations described herein. Alternatively, as another example, when processor 145 is embodied as an executor of instructions, such as may be stored in memory 115, the instructions may specifically configure processor 145 to perform one or more algorithms and operations described herein.

Memory 115 may comprise, for example, volatile memory, non-volatile memory, or some combination thereof. Although illustrated in FIG. 1 as a single memory, memory 115 may comprise a plurality of memory components. The plurality of memory components may be embodied on a single computing device or distributed across a plurality of computing devices. In various embodiments, memory 115 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. Memory 115 may be configured to store information, data (including promotion data, provider data, orientation data, and/or distribution data), applications, instructions, or the like for enabling promotional system 110 to carry out various functions in accordance with example embodiments of the present invention.

In at least some embodiments, memory 115 may be configured to buffer input data for processing by processor 145. Alternatively or additionally, in at least some embodiments, memory 115 may be configured to store program instructions for execution by processor 145. Memory 115 may store information in the form of static and/or dynamic information. This stored information may be stored and/or used by consumer device 165 or provider device 170 during the course of performing its functionalities.

As may be understood from FIG. 1 in this embodiment, the system 100 includes one or more consumer devices 165 and/or provider devices 170 that are connected, via a network 160 (e.g., a LAN or the Internet), to communicate with the promotional system. The consumer device 165 and the provider device 170 are merely shown to illustrate the potential for multiplicity in relation to the number of devices that may interface with the promotional system. Thus, some embodiments may employ only one of consumer device 165 and provider device 170, while other embodiments may employ two or more such devices.

In an example embodiment, either or both of consumer device 165 and provider device 170 may be a personal computer (PC) or a laptop computer associated with a particular individual or organization. For example, one or more computers may be associated with consumers and another one or more computers may be associated with a provider or another entity. However, in other cases, either or both of consumer device 165 and provider device 170 may be a personal digital assistant (PDA), mobile telephone (or smart phone), or a client terminal associated with a provider or other entity. As such, in some cases, consumer device 165 or provider device 170 may represent a terminal for allowing a user to interface with the promotional system 110.

Communication interface 155 may be embodied as any device or means embodied in circuitry, hardware, a computer program product comprising computer readable program instructions stored on a computer readable medium (e.g., memory 115) and executed by a processing device (e.g., processor 145), or a combination thereof that may be configured to receive and/or transmit data from/to another device, such as, for example, consumer device 165, provider device 170, and/or the like. In some embodiments, communication interface 155 (like other components discussed herein) can be at least partially embodied as or otherwise controlled by processor 145. In this regard, communication interface 155 may be in communication with processor 145, such as via a bus. Communication interface 155 may include, for example, an antenna, a transmitter, a receiver, a transceiver, network interface card and/or supporting hardware and/or firmware/software for enabling communications with another computing device. Communication interface 155 may be configured to receive and/or transmit any data that may be stored by memory 115 using any protocol that may be used for communications between computing devices. Communication interface 155 may, alternatively or additionally, be in communication with the memory 115, input/output module 150 and/or any other component of promotional system 110, such as via a bus.

Input/output module 150 may be in communication with processor 145 to receive an indication of a user input and/or to provide an audible, visual, mechanical, or other output to a user. As such, input/output module 150 may include support, for example, for a keyboard, a mouse, a joystick, a display, a touch screen display, a microphone, a speaker, a RFID reader, credit card reader, barcode reader, biometric scanner, and/or other input/output mechanisms as represented by input/output module 150. Input/output module 150 may be in communication with the memory 115, communication interface 155, and/or any other component(s), such as via a bus. Although more than one input/output module and/or other component can be included in promotional system 110, only one is shown in FIG. 1 to avoid overcomplicating the drawing (like the other components discussed herein).

FIG. 1 also shows an example circuitry that may be included in promotional system 110, which may be configured to perform the functionality discussed herein. As illustrated in FIG. 1 and in accordance with some example embodiments, promotional system 110 may include various means, such as request module 130, orientation module 135, and/or distribution module 140.

Request module 130 may be included and configured to perform the functionality discussed herein related to receiving requested promotions and/or requested providers from one or more consumers. In some embodiments, the requested promotions may be defined by or otherwise organized into a taxonomy or hierarchy. The taxonomy or hierarchy may categorize the one or more promotions using category or a sub-category that identifies a service or product, a price, and at least one location. In another embodiment, some or all of the functionality of receiving, identifying, and/or indicating requested promotions and/or requested providers may be generated by processor 145. For example, non-transitory computer readable media can be configured to store firmware, one or more application programs, and/or other software, which include instructions and other computer-readable program code portions that can be executed to control each processor (e.g., processor 145 and/or request module 130) of the components of promotional system 110 to implement various operations, including the examples shown above. As such, a series of computer-readable program code portions are embodied in one or more computer program products and can be used, with a computing device, server, and/or other programmable apparatus, to produce machine-implemented processes.

For example, request module 130 may be configured to receive requested promotion data, and/or requested provider data, such as from a consumer. The consumer may request a promotion and/or provider for addition to a consumer demand list via a link, button, icon, requesting to add to a wishlist, request form, communication, text, and/or the like displayed as output by input/output module 150. In some embodiments, a link, button, icon, request form, communication, text, and/or the like may be presented to a consumer along with a promotion. In other embodiments, a message, pop-up, screen tip, and/or the like displayed via a screen provided by, for example, input/output module 150 may assist the consumer in requesting a promotion and/or provider.

The request module 130 may also be configured to indicate to at least one consumer at least one promotion or provider in response to a request. The request for a promotion or provider may be achieved by way of a consumer querying a database (e.g., database 120) by entering a search, browsed selections, and/or the like via input/output module 150. For example, a consumer may enter a request, via a search, for XYZ Pizza. In response to the search, request module 130 may cause the screen to indicate that no promotions were located matching the search. In addition, the consumer may be presented with an option to add the search, a particular provider, or a particular promotion as a consumer request.

Further, request module 130 may also be configured to access programs 125 that may update the consumer demand list with the consumer request. In example embodiments, request module 130 may indicate, to the consumer, the consumer request as associated with the consumer demand list via a notification such as, a communication, a text message, a link, an icon, a button, and/or the like. A consumer may be presented with the option to remove, view, purchase, prioritize, favorite, share, etc. a requested promotion and/or provider via a screen displaying a consumer demand list. For example, a consumer who selects a promotion for ABC Burger for addition to a consumer demand list may view that particular promotion via a consumer demand list as provided by input/output module 150. In other embodiments, request module 130 may notify a consumer when the promotion on a consumer demand list is available and/or the provider on a consumer demand list offers a promotion. For example, input/output module 150 may display a notification via a screen that the promotion for ABC Burger previously added to the consumer demand list is currently available. Although request module 130 is shown as being a single module included in single promotional system 110, request module 130 (like other devices and components discussed herein) can be embodied as a plurality of distributed systems, apparatuses, and/or any other suitable machine(s).

Orientation module 135 may be configured to generate an aggregated list of requested providers and/or requested promotions from databases 120. In order to generate an aggregated list, orientation module 135 may be configured to receive requested promotions and/or requested providers based in part on the consumer request received via request module 130. Orientation module 135 may, in some example embodiments, be configured to aggregate or combine one or more of the consumer requests in order to determine or otherwise ascertain demand information. For example, by aggregating consumer requests from across Wrigleyville, the system may derive a particular demand for a promotion or a provider. As such, the promotions and provider requests received as consumer requests may be combined, aggregated or otherwise counted to generate a demand indication or to otherwise ascertain demand.

Alternatively or additionally, orientation module 135 may be configured to rank the aggregated list of at least one consumer request. The ranked lists may be stored in memory 115, databases 120, and/or the like. In some embodiments, a promotion score may be assigned to each of the requested promotions. A promotion score may include a score assigned to a promotion based on promotion availability, consumer requests, seasonality, and/or the like. For example, an aggregated list of 15 massage promotions may have a category "health and beauty," sub-category "spa," service "30 minute massage," service "90 minute massage," and/or the like. Service "90 minute massage" may have been requested by 10 consumers yielding an assignment of "1" to each request giving service "90 minute massage" a total promotion score of 10. Service "30 minute massage" may have been requested by 5 consumers yielding an assignment of "1" to each request giving service "30 minute massage" a total promotion score of 5.

In other embodiments, orientation module 135 may be configured to assign a provider score to each of the requested providers. The provider score may comprise a review score, competitor promotion score, prior performance of related providers score, geographic score, and/or the like. For example, 12 providers may be assigned 12 provider scores based in part on the review score each provider received on a review website.

Additionally, or alternatively, orientation module 135 may be configured to generate a ranked list by ordering the requested promotion and/or requested provider based in part on the promotion score and/or provider score assigned to each of the requested promotions and/or requested providers. For example, orientation module 135 may rank a "30 minute massage" with a promotion score of 5 (e.g. based on requests received by 5 consumers) lower than a "90 minute massage" with a promotion score of 10 (e.g. based on requests received by 10 consumers). Although orientation module 135 is shown as being a single module included in single promotional system 110, orientation module 135 (like other devices and components discussed herein) can be embodied as a plurality of distributed systems, apparatuses, and/or any other suitable machine(s).

Distribution module 140 may be configured to cause, by a processor (e.g., processor 145), at least one ranked list to be distributed to at least one sales resource. In order to cause the ranked list to be distributed, distribution module 140 may receive the ranked lists generated via orientation module 135. The ranked lists may comprise one or more requested providers and/or requested promotions. In an example embodiment, distribution module 140 may further be configured to allocate, using a processor (e.g., processor 145), at least one ranked lists to at least one sales resource. In some embodiments, the ranked lists may be deallocated from a sales resource. In other embodiments, the ranked list may be reallocated to another sales resource. Although distribution module 140 is shown as being a single module included in single promotional system 110, distribution module 140 (like other devices and components discussed herein) can be embodied as a plurality of distributed systems, apparatuses, and/or any other suitable machine(s).

In some examples, the distribution module 140 may be configured to use the aggregated list, ranked list or the like as a signal for demand. In some examples, this demand may be usable by a sales resource to assist in the sale of the promotion by demonstrating to a provider a high level of interest in a promotion or a provider in the local area. For example, a provider may be more likely, and in some cases be more profitable, if there is a high demand for the particular service. In other examples, a high demand for services, based on consumer requests, and a provider offering the same or similar promotion may suggest that the current provider lacks the quality required by the market.

Indeed, in some examples, the use of the demand information may lead to the opening of new providers or for providers to add additional services. Alternatively or additionally, the demand information that is suggested by the aggregated list, the ranked list or the like might suggest redemption parameters, margin for the promotion and marketing system, deal structure and/or the like. In further examples, the aggregated list, the ranked list or the like may be feed into a sales system, such as the sales system described in U.S. patent application Ser. No. 13/803,445, to simulate or otherwise inform demand. In some examples, demand information may be used to directly inform providers of demand that may be undeveloped, unrealized, unused, untapped, latent, etc. In such example embodiments, consumer requests may be distributed to providers without distributing the consumer requests to a sales resource. For example, in a workflow that enabled a provider to build or otherwise design a promotion, latent demand information may be presented to the provider to help them design a promotion, influence projected return on investment for the promotion and/or the like. Alternatively or additionally, demand information may inform purchasing decisions for goods to be offered by the promotion and marketing service.

Alternatively or additionally, the aggregated list, ranked list or the like may be configured to determine a forecasted demand for promotions. The forecasted demand provides or otherwise enables a prediction of those promotions that a consumer will likely purchase if offered, and, as such, enables the prioritization of the sales of the forecasted or demanded offers, which may result in greater interest, revenue, higher margin, offer diversity and/or the like.

In some examples, however, one or more demanded offers may already be present in an inventory. In such examples, the method, apparatus and computer program product described herein is operable to modify or otherwise adjust the demand to account for a current inventory of offers. Other adjustments may also be performed, based on seasonality, economic conditions, geography, climate and/or the like.

Once a set of adjustments has been performed, in some example embodiments, one or more providers may be identified that may provide the demanded offer. Providers that provide the same or similar goods, services or experiences may be matched or otherwise assigned to the demanded offers. As such, a provider may be assigned zero or more virtual offers.

Using a series of ranking metrics described herein, the providers may be ranked. In some examples, the ranking may be based on expected revenue, business objectives, sales timeline, sales probability, merchant diversity, offer diversity and/or the like. In some examples, the ranked list may provide an example ordering in which sales calls may be made.

The ranked list of providers may then be programmatically assigned to one or more sales resources, such as a sales representative, a sales contractor, a marketing person or team, an email distribution list, a self-service tool, or the like. In some examples, the assignment may be dynamically modified based on current resources, need, diversity, probability to close, time to close, business objectives and/or the like, while in other examples an assignment may be removed in an instance in which there is no longer a demand for the particular service, good or experience provided by the particular provider. Alternatively or additionally, each provider or demanded offer may be assigned a value, in such cases the value may be suggestive of a bounty or reward system, such as a commission or a bonus for the sales resource.

Alternatively or additionally, the consumer demand list, the ranked list, the aggregated list, the consumer request or like may feed one or more relevance systems. Relevance may include an analysis to determine which promotion(s) to offer to the consumer for a product or a service. According to another embodiment, a relevance system may be configured for determining which of a plurality of consumer promotions to present to a consumer. The plurality of promotions may be for goods and or for services.

A method for determining relevance may comprise accessing, in at least one memory, consumer data associated with the consumer, accessing, in the at least one memory, deal data associated with the plurality of consumer promotions (e.g., historical promotions, current promotions on a consumer demand list, and/or the like), scoring the plurality of consumer promotions by using part or all of the consumer data and part or all of the deal data, re-scoring the plurality of consumer promotions using the same or different consumer data used to score the plurality of consumer deals, and determining, using at least one processor, which of the plurality of consumer promotions to present to the consumer based on the re-scoring of the plurality of consumer promotions.

In some embodiments, the same or different consumer data may be used to score the plurality of promotions as to re-score the plurality of promotions. Further, the same or different promotion data may be used to score the plurality of consumer promotions as to re-score the plurality of consumer promotions. For example, consumer location data may be used to score the plurality of consumer promotions, and to re-score the plurality of promotions. As another example, consumer data other than consumer previous purchase data may be used to score the plurality of consumer promotions, and consumer previous purchase data may be used to re-score the plurality of promotions. Further, the scoring of the plurality of promotions may be performed using a scoring model, and the re-scoring may be done without a different model or with a correction factor. In some embodiments, the scoring of the plurality of promotions may be performed using no scoring model (such as a correction factor), and the re-scoring may be done using a scoring model. Other example relevance systems may be found in each of U.S. patent application Ser. No. 13/411,502, filed Mar. 2, 2012, titled "RELEVANCE SYSTEM FOR CONSUMER DEALS", U.S. patent application Ser. No. 13/829,581 entitled "Promotion Offering System" and filed on Mar. 14, 2013, U.S. patent application Ser. No. 12/776,028, now U.S. Pat. No. 8,355,948, titled "SYSTEM AND METHODS FOR DISCOUNT RETAILING" filed on May 7, 2010, each of which is hereby incorporated by reference, algorithms are provided for matching consumers to relevant promotions.

Alternatively or additionally, the consumer demand list, the ranked list, the aggregated list, the consumer request or like may not only be used in providing greater relevance ranking for promotions in a similar category to those on the consumers' wishlist, but may be used as a geographic input for relevance data. For example, if consumer is known to like a pizza place of a similar quality and similar geography (e.g., based on historic data), a prediction may be made that the same consumer may be interested in filing a latent demand signaled by a wishlist selection with a pizza place in the same neighborhood as another potential promotion. For example, a pizza promotion for a night that already included a movie in the geographical area.

Figure 2:
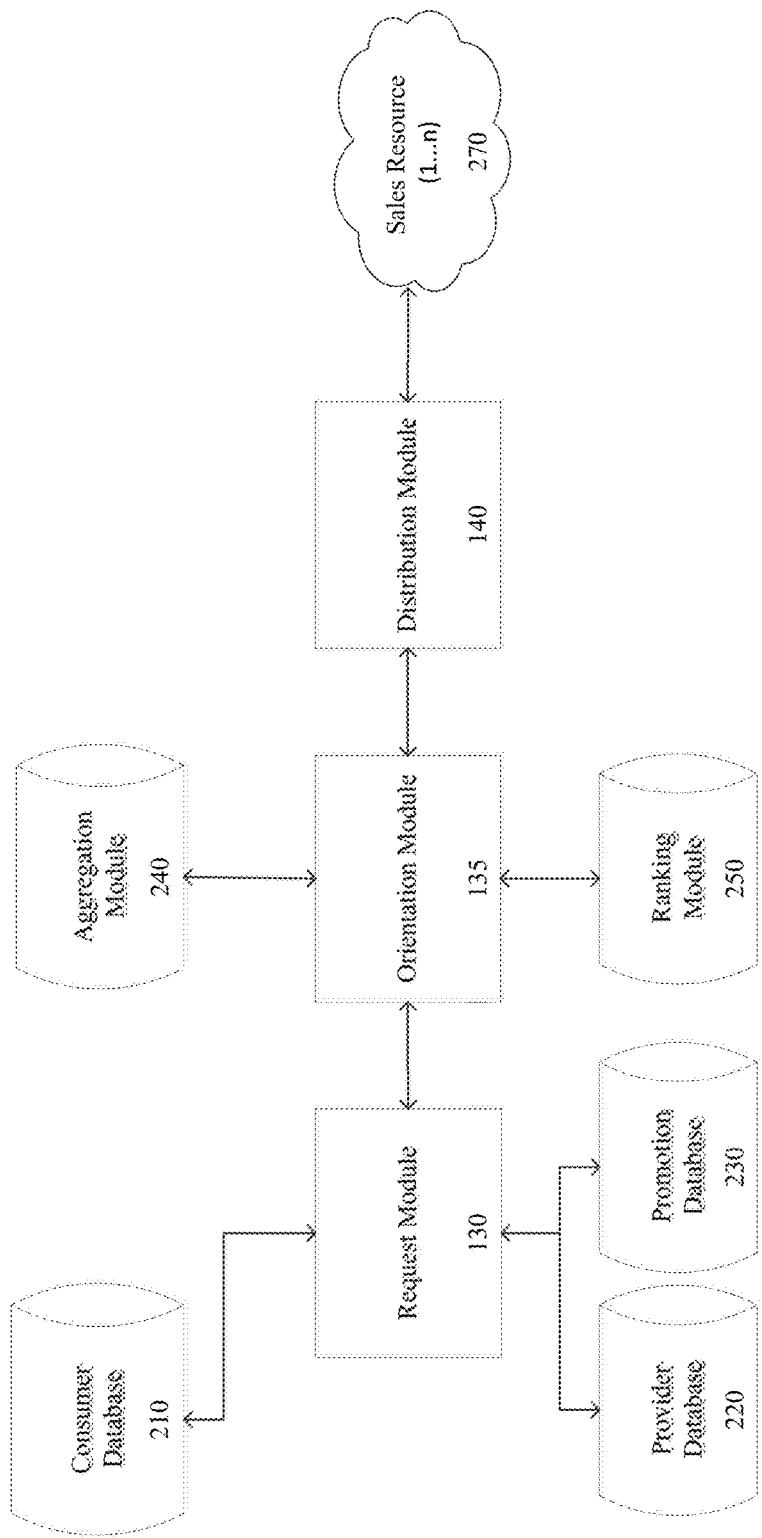
FIG. 2 is a flowchart showing an exemplary process for utilizing a consumer request to ascertain demand for a promotion engine.

By way of further example, FIG. 2 is a block diagram that illustrates an exemplary process for ascertaining demand in, for example, promotional system 110. In general, the process 200 may receive consumer request data, via request module 130, for one or more requested promotions stored in a promotion database (e.g. promotion database 230) and/or requested providers stored in a provider database (e.g. provider database 220). The consumer request illustrates and/or otherwise identifies the promotions and/or providers a consumer may be willing to purchase and/or patronize. For example, one or more consumers, such as 15 consumers, may request to add a promotion for a product or service (e.g. $25 for $50 toward a massage) to a consumer demand list.

In order to ascertain demand, orientation module 130 may be configured to generate at least one aggregated list of one or more requested promotions and/or requested providers received via, for example, request module 130. Orientation module 135 may aggregate at least one requested promotion and/or provider via aggregation module 240 to generate the aggregated list. Aggregation module 240 may be configured to aggregate one or more requested promotions and/or providers using a defined hierarchy or taxonomy that relates the one or more promotions, for example, into one or more categories, sub-categories, services, and/or the like that identifies a service or product, a price, and at least one location. In some embodiments, orientation module 135 may receive consumer request data from consumer database 210 via request module 130. Alternatively, orientation module 135 may receive consumer request data from provider database 220, promotion database 230, and/or the like via request module 130. Further orientation module 135 may be configured to store the aggregated data in, for example, aggregation module 240, memory 115, and/or the like.

For example, request module 130 may have received 15 massage promotion requests (e.g. requested promotions) as defined in consumer database 210. The aggregated list of the massage promotions generated via orientation module 135 may be defined within aggregation module 240 as having a category "health and beauty," sub-category "spa," service "30 minute massage," service "90 minute massage," and/or the like.

In some example embodiments, promotional system 110 may be configured to rank the aggregated list of at least one consumer request via orientation module 135. The ranking may be based, in part, on the consumer request, geographic data, and/or the like. Orientation module 135 may further be configured to assign (e.g. using ranking module 250) a promotion score to each of the one or more requested promotions. The promotion score may include a score assigned to a promotion based on promotion availability, consumer requests, seasonality, etc. In some embodiments, orientation module 135 may assign (e.g. using ranking module 250) a provider score to each of the one or more requested providers. The provider score may include a review score, competitor promotion score, prior performance of related providers score, geographic score, etc. As illustrated in some embodiments, orientation module 135 may generate one or more ranked lists of at least one consumer request. Further orientation module 135 may be configured to store the ranked list in, for example, memory 115, ranking module 250, and/or the like.

For example, service "90 minute massage" (requested by 10 consumers) may be assigned a "1" for each consumer request by ranking module 250, via orientation module 135, yielding a promotion score of 10. Service "30 minute massage" (requested by 5 consumers) may yield a promotion score of 5. Orientation module 135 may generate a ranked list that includes the "30 minute massage" with a promotion score of 5 ranked lower than the "90 minute massage" with the promotion score of 10. The ranked list of massage promotions may be stored in memory 115, ranking module 250, and/or the like.

In some example embodiments, promotional system 110 may be configured to geographically rank the aggregated list of at least one consumer request via orientation module 135. For example, one or more consumer requests for a massage at Massage Company A in Wicker Park may cause a promotional system, such as promotional system 110, to assign a provider score, based in part on a geographic score, to the massage companies located within a determined range of Wicker Park. Massage Company B located within two miles of Wicker Park may be assigned a provider score of 20, while Massage Company C located within five miles of Wicker Park may be assigned a provider score of 10. Orientation module 135 may generate a ranked list that includes "Massage Company B" with a provider score of 20 ranked higher than "Massage Company C" with a provider score of 10. The ranked list of massage providers may be stored in memory 115, ranking module 250, and/or the like.

In another example embodiment, distribution module 140 may be configured to cause, by a processor (e.g. processor 145), one or more ranked lists to be distributed via a promotional system (e.g. promotional system 110), to at least one sales resource 270. The ranked lists in example embodiments may include one or more requested promotions and/or one or more requested providers. Distribution module 140 may be configured to allocate one or more ranked lists to at least one first sales resource 270. Further, distribution module 140 may deallocate the one or more ranked lists from the first sales resource 270. In some embodiments, distribution module 140 may further be configured to reallocate the one or more ranked lists to a second sales resource 270.

For example, distribution module 140 may cause the ranked list to be allocated to Resource A. The distribution module 140 may deallocate one or more ranked lists including consumer requests for "90 minute massage" should the promotional demand be supplied, the promotion becomes available for purchase, demand declines, etc. Distribution module 140 may reallocate one or more ranked lists including consumer requests for "90 minute massage" to Resource B if, for example, the ranked list resides in a queue for Resource A for a period of time, Resource A is unable to get the consumer requests filled, Resource A is unavailable, etc.

Alternatively or additionally, in some examples, the aggregated list, ranked list or the like may be used to inform an inventory management process. For example, the lists may be used to suggest the number of promotions to have in inventory for an upcoming time period so that the promotions are available to satisfy a perceived demand as indicated by the aggregated list, the ranked list or the like.

Process for Receiving Consumer Requests

Figure 3:
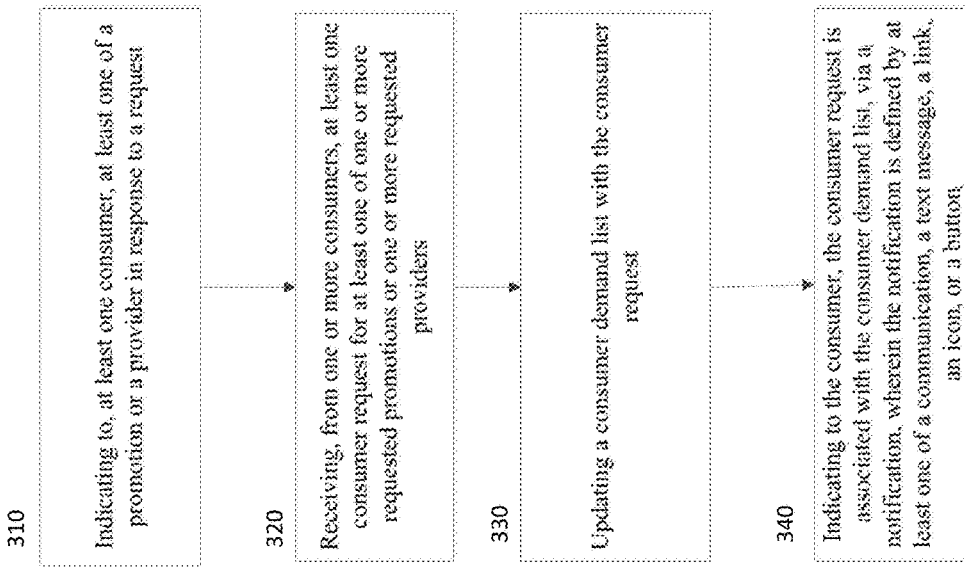
FIG. 3 is a flowchart showing an exemplary process of receiving consumer requests in accordance with some example embodiments discussed herein.

FIG. 3 shows an example method, namely process 300, that may be executed by one or more machines (some examples of which are discussed in connection with FIGS. 1 and/or 2) to receive a consumer request for one or more requested promotions and/or requested providers. As shown in block 310, an apparatus such as promotional system 110, may include means, such as request module 130, processor 145, or the like for indicating a promotion and/or a provider in response to a request from, for example, at least one consumer. The request may be achieved in part by, for example, a search, browsed selections, and/or the like. In another embodiment, an indication of one or more promotions and/or providers may be achieved via an impression which may take the form of print media, e-mail, text message, application alert, mobile applications, or the like. For example, an application alert sent to consumers that indicates the availability of a promotion of $5 for $10 toward a meal at ABC Burger.

As shown in block 320 of FIG. 3, the promotional system 110, may include means, such as request module 130, processor 145, or the like for receiving one or more consumer requests for one or more requested promotions and/or requested providers. Receiving, via request module 130, at least one consumer request may be accomplished based in part on data that is retrieved from consumer database 210, provider database 220, and/or promotion database 230. In some embodiments, request module 130 may receive a consumer request via a link, button, icon, request form, communication, text, and/or the like presented along with a promotion to a consumer. In other embodiments, a message, pop-up, screen tip, and/or the like displayed via a screen provided by, for example, input/output module 150 may assist a consumer in requesting a promotion and/or provider. In another example embodiment, a consumer may add one or more promotions and/or providers to a consumer demand list via an icon, such as a thumbs up icon. For example, request module 130 may receive a request for a promotion of $5 for $10 toward a meal at ABC Burger via a consumer selection of a button entitled, for example, "Add to Wishlist." In another example, request module 130 may receive a request for a promotion of $5 for $10 toward a meal at ABC Burger via a consumer selection of an icon, for example, a thumbs up icon.

As shown in block 330 of FIG. 3, the promotional system 110, may include means, such as request module 130, the processor 145, or the like for updating a consumer demand list with the consumer request. In general, a consumer demand list may be updated by storing, in databases 120, consumer request data in the consumer demand list.

As shown in block 340 of FIG. 3, the promotional system 110, may include means, such as request module 130, processor 145, or the like for indicating the consumer request is associated with the consumer demand list. Indicating the consumer request is associated with the consumer demand list may be accomplished via a notification. In some example embodiments, the notification comprises a communication, text message, link, icon, button, and/or the like. In other embodiments, request module 130 may notify a consumer when the promotion on a consumer demand list is available and/or the provider on a consumer demand list offers a promotion. For example, input/output module 150 may display a notification, such as "The promotions on your Wishlist are currently available," via a screen that includes the promotion for ABC Burger previously added to the consumer demand list.

Process for Orienting Consumer Requests

Figure 4:
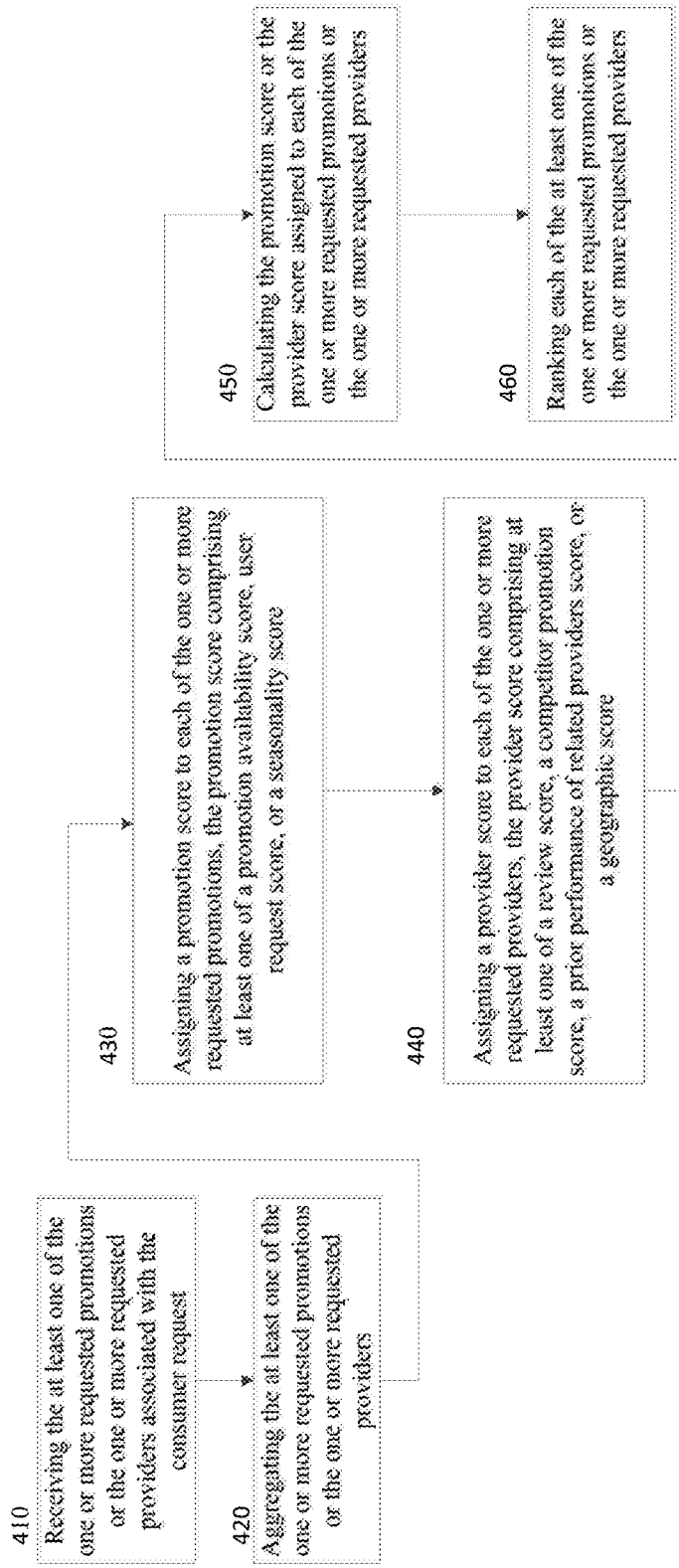
FIG. 4 is a flowchart showing an exemplary process of orienting data in accordance with some example embodiments discussed herein.

FIG. 4 shows an example method, namely process 400, that may be executed by one or more machines (some examples of which are discussed in connection with FIGS. 1 and/or 2) to generate an aggregated list in accordance with some embodiments discussed herein. As shown in block 410, an apparatus such as promotional system 110, may include means, such as orientation module 135 and processor 145 or the like for aggregating consumer request data. In some embodiments, promotional system 110, may further include means, such as orientation module 135 and processor 145 or the like for ranking consumer request data.

In general, one or more requested promotions and/or one or more requested providers associated with the consumer request may be received, for example as in block 410.

As shown in block 420 of FIG. 4, an apparatus, such as promotional system 110, may include means, such as the orientation module 135 and processor 145 or the like for aggregating at least one of the requested promotions and/or requested providers. In some embodiments, aggregating the requested promotions and/or requested providers may be accomplished by directing, by a processor (e.g. processor 145), the requested promotions and/or requested providers to one or more categories, sub-categories, services, etc. For example, as illustrated above, an aggregated list of 15 massage promotions may be defined having a category "health and beauty," sub-category "spa," service "30 minute massage," service "90 minute massage," and/or the like.

As shown in block 430 of FIG. 4, an apparatus, such as promotional system 110 may include means, such as the orientation module 135 and processor 145 for assigning a promotion score to each of the one or more requested promotions. The promotion score may include a score assigned to a promotion based on promotion availability, consumer requests, seasonality, and/or the like. Referring to the massage example, service "90 minute massage" may be requested by 10 consumers including an assignment of "1" to each requested promotion. Service "30 minute massage" may be requested by 5 consumers including an assignment of "1" to each requested promotion.

In some example embodiments, a provider score may be assigned to each of the requested providers as shown in 440 of FIG. 4. The provider score may comprise a review score, competitor promotion score, prior performance of related providers score, geographic score, and/or the like. The requested promotion data and/or requested provider data may be stored in a database (e.g., ranking module 250) by for example, orientation module 135. Alternatively, requested promotion data and/or requested provider data may be stored in memory (e.g., a local memory, a remote memory or the like), such as memory 115, by, for example, orientation module 135.

As shown in block 450 of FIG. 4, an apparatus, such as promotional system 110, may include means, such as orientation module 135 and processor 145 for calculating the promotion score and/or provider score assigned to each of the requested promotions and/or requested providers. For example, orientation module 135 may calculate a promotion score of 10 for service "90 minute massage" requested by 10 consumers that includes an assignment of "1" to each requested promotion. Orientation module 135 may calculate a promotion score of 5 for service "30 minute massage" requested by 5 consumers that includes an assignment of "1" to each requested promotion.

As shown in block 460 of FIG. 4, an apparatus, such as promotional system 110, may include means, such as orientation module 135 and processor 145 for ranking each of the requested promotions and/or requested providers. In some example embodiments, the requested promotions and/or requested providers may be ranked in part by calendar data (e.g. date, season, days, weeks, months), the calculated promotion score, and/or the calculated provider score assigned to each of the requested promotions and/or requested providers. The ranked list generated by orientation module 135 may be ranked by ordering the requested promotions and/or requested providers. The ranked list may include a list of relationships as between one or more items (e.g., requested promotions and/or requested providers) such that one item is ranked higher than the other, lower than the other, equal to the other, etc. For example, the "90 minute massage" with the promotion score of 10 may be ranked higher than the "30 minute massage" with a promotion score of 5 on the ranked list. In other examples, if a consumer request for the "90 minute massage" was received on Sep. 30, 2013 and a consumer request for the "30 minute massage" was received on Oct. 1, 2013, orientation module 135 may rank either promotion higher or lower than the other. In some examples, the ranking may decay overtime based on the length a promotion or provider is requested without the requested deal being purchased. The ranked list may provide an example ordering in which sales calls may be made, consumer interest may be gaged, and/or the like.

Process for Causing Distribution of Ranked List

Figure 5:
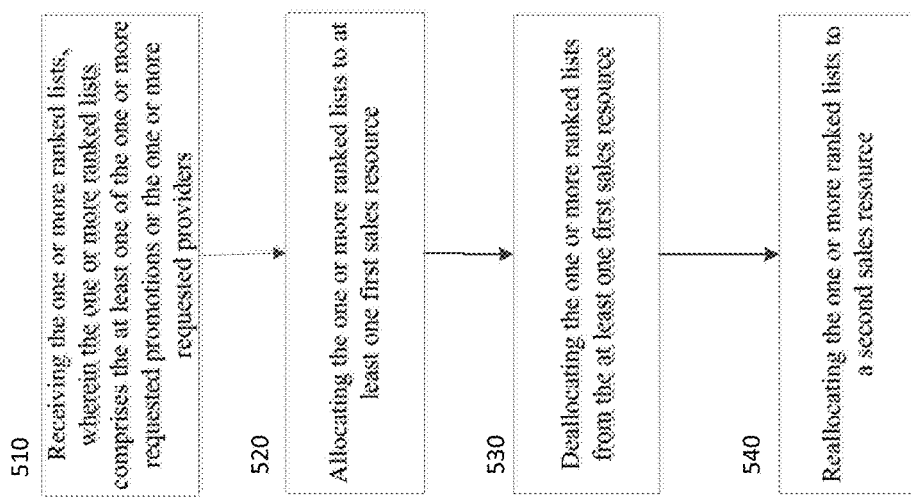
FIG. 5 is a flowchart showing an exemplary process of distributing data in accordance with some example embodiments discussed herein.

FIG. 5 shows an example method, namely process 500, that may be executed by one or more machines (some examples of which are discussed in connection with FIGS. 1 and/or 2) to cause one or more ranked lists to be distributed for use by at least one sales resource. As shown in block 510 of FIG. 5, an apparatus, such as the promotional system 110, may include means, such as the distribution module 140, the processor 145, the communication interface 155, or the like, for receiving one or more ranked lists. In some example embodiments, ranked lists may comprise one or more requested promotions and/or one or more requested providers.

As shown in block 520 of FIG. 5, an apparatus, such as the promotional system 110, may include means, such as distribution module 140, processor 145, communication interface 155 or the like, for allocating the one or more ranked lists to at least one sales resource. The distribution may be dynamically allocated and/or modified based on current resources, need, business objectives, and/or the like.

As shown in block 530 of FIG. 5, an apparatus, such as the promotional system 110, may include means, such as the distribution module 140, the processor 145, the communication interface 155 or the like, for deallocating the one or more ranked lists from one or more sales resources. In some example embodiments, one or more ranked lists may be deallocated should, for example, the promotional demand be supplied, the promotion becomes available for purchase, demand declines, etc.

As shown in block 540 of FIG. 5, an apparatus, such as the promotional system 110, may include means, such as the distribution module 140, the processor 145, the communication interface 155 or the like, for reallocating one or more ranked lists to another sales resource. In another embodiment, the ranked list may be reallocated should, for example, the ranked list reside in a queue for a sales resource over a period of time, a sales resource is unable to get the consumer requests filled, a sales resource is unavailable, etc.

Figure 6:
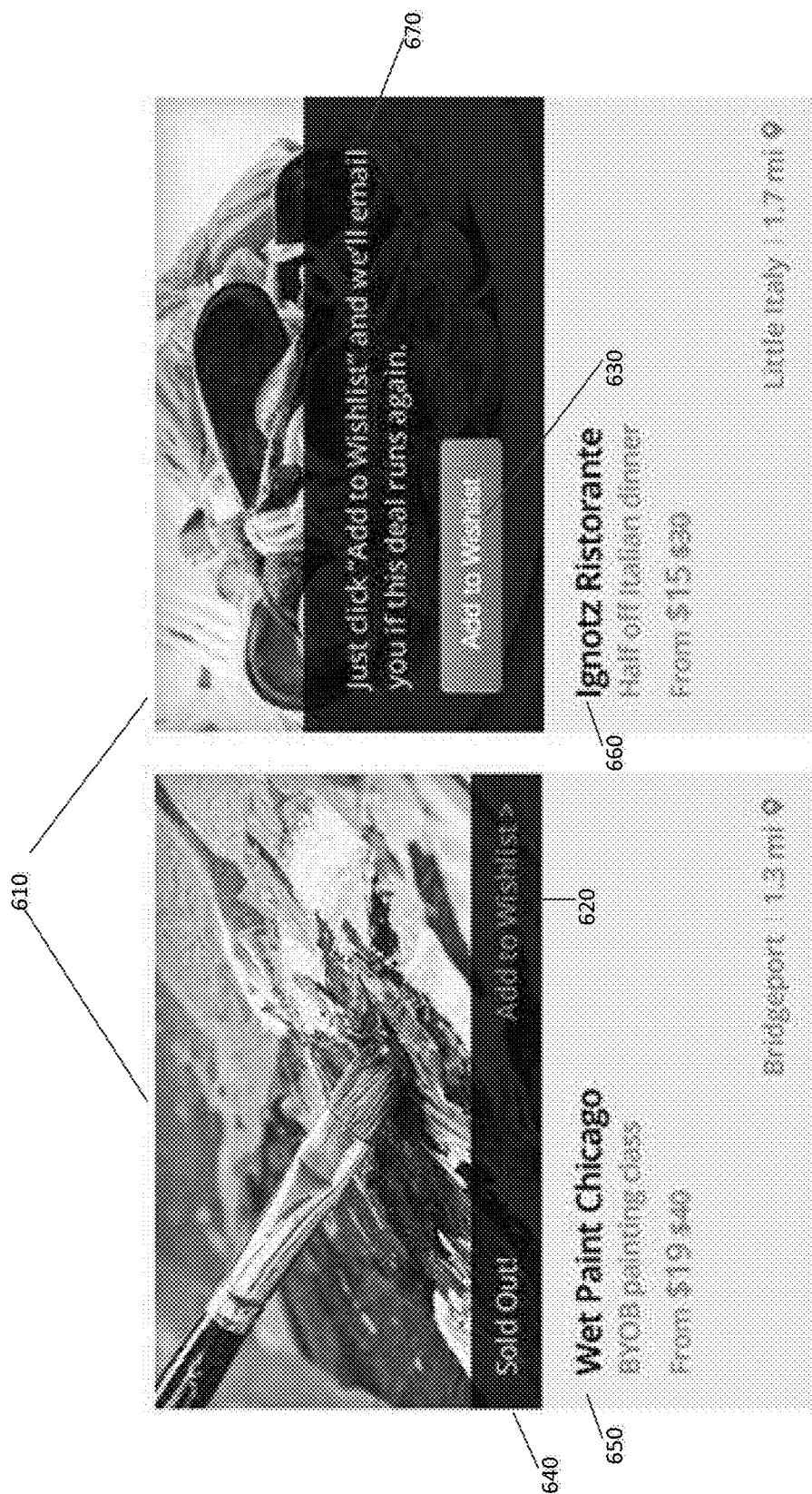
FIG. 6 shows an example graphical user interface display that may be presented by various components of systems in accordance with some example embodiments discussed herein.

FIG. 6 shows an example embodiment of a graphical user interface display 610 that may be used in an example embodiment to request a promotion. As can be seen in FIG. 6, one or more promotions may be shown along with a link 620 and/or button 630 that when selected provides a consumer request to request module 130. In FIG. 6, a currently unavailable promotion 640 for Wet Paint Chicago 650, a painting class, is shown along with a link 620 that when selected provides a consumer request for Wet Paint Chicago to the request module 130 and; thereby, adds the requested promotion for Wet Paint Chicago to a consumer demand list. Also illustrated is another exemplary embodiment of a promotion for Ignotz Ristorante 660 that includes a button 630 that when selected provides a consumer request to request module 130. Additionally, in this example embodiment, a message 670 is shown to a consumer prompting the consumer to click the button 630 in order to receive notifications when the promotion becomes available. When the button 630 is selected, in this example, a consumer request is provided to request module 130 and, thereby, the requested promotion for Ignotz Ristorante 660 is added to a consumer demand list.

Figure 7:
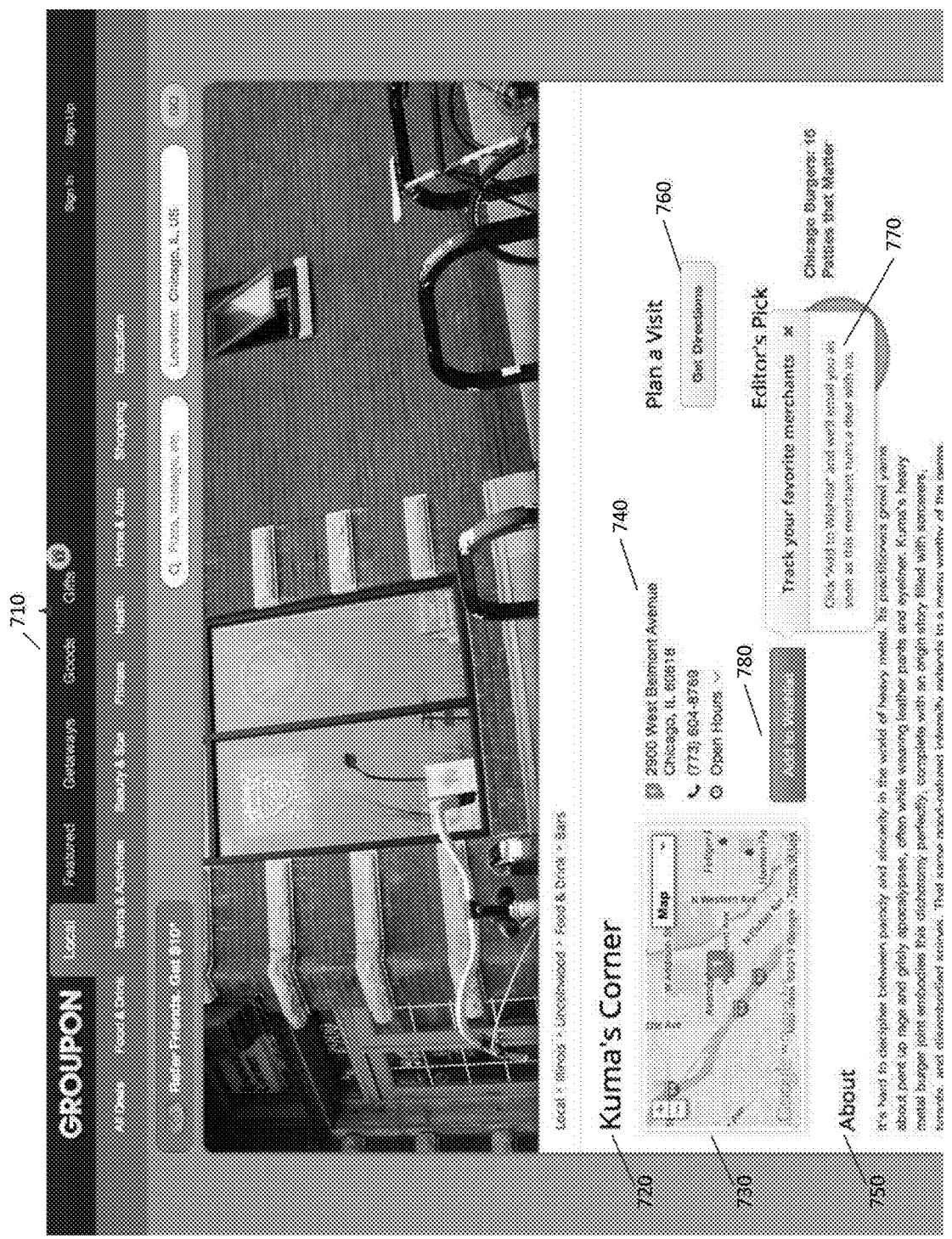
FIG. 7 shows an example graphical user interface display that may be presented by various components of systems in accordance with some example embodiments discussed herein.

FIG. 7 shows an example graphical user interface display 710 that may be used in an example embodiment to request a provider. As can be seen in FIG. 7, a page for a provider not currently offering promotions 720, such as Kuma's Corner, may be shown along with information associated with the provider. Here, the information for Kuma's Corner is shown which includes a map 730, the address 740, and a description 750 about Kuma's Corner. The consumer may plan a visit to Kuma's Corner and/or get directions via a button 760. Also illustrated is a screen tip 780 prompting the consumer to track providers of interest to the consumer by selecting the included button 760 (e.g., a button that facilitates the consumer request), here entitled, "Add to Wishlist."

Figure 8:
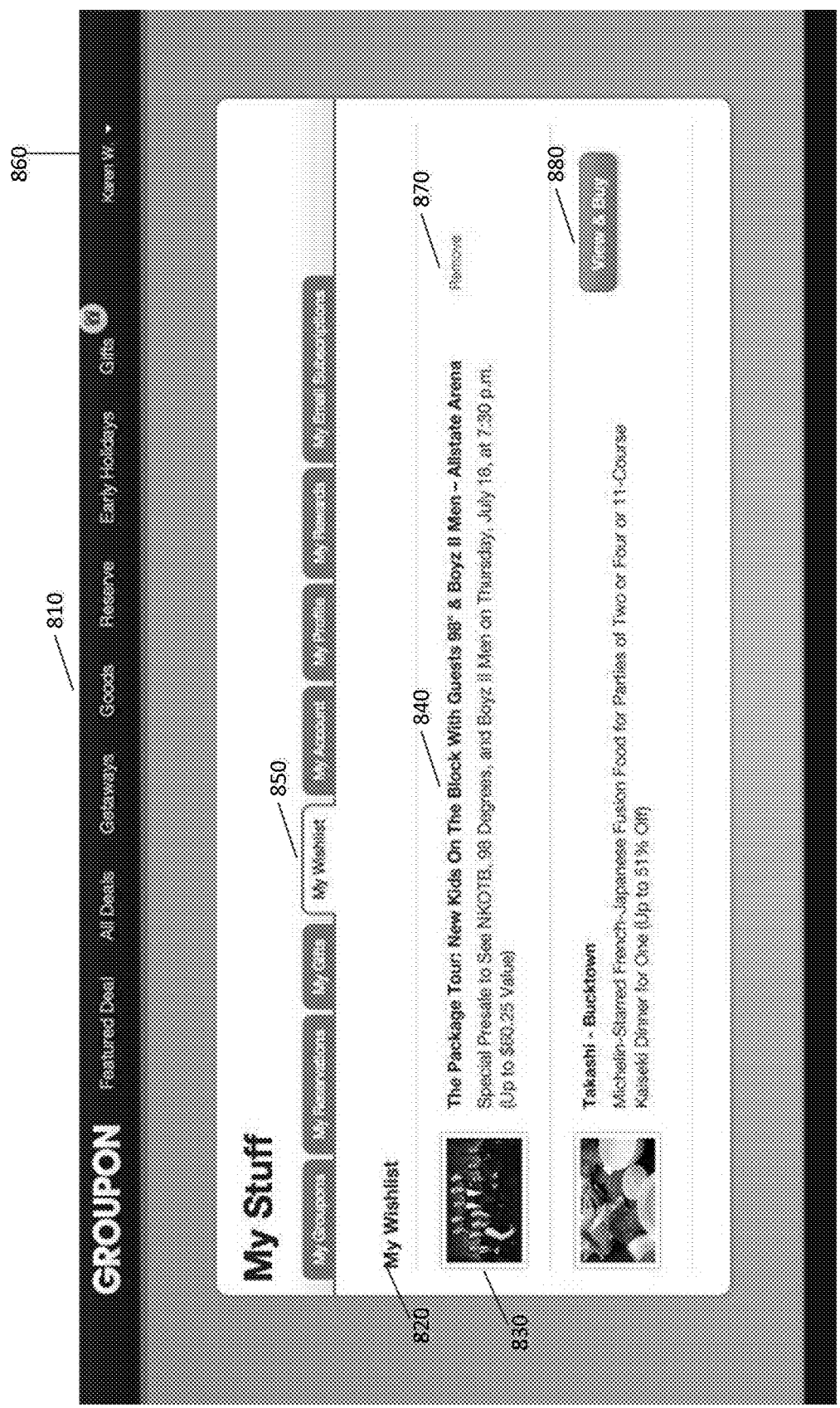
FIG. 8 shows an exemplary screenshot of a request module.

FIG. 8 shows an exemplary screenshot of a request module 810. As can be seen, a consumer demand list 820 may be shown that may include one or more requested promotions 830 and/or providers along with a description 840. In some example embodiments, the consumer demand list may be a tabbed page 850 within a consumer account 860 as shown here. Also shown here are two promotions (i.e., a promotion for the New Kids on the Block concert and a promotion for Takashi). In other example embodiments, a consumer may have the option of removing the New Kids on the Block concert via a link 870 or viewing and/or purchasing 880 the Takashi promotion.

Figure 9:
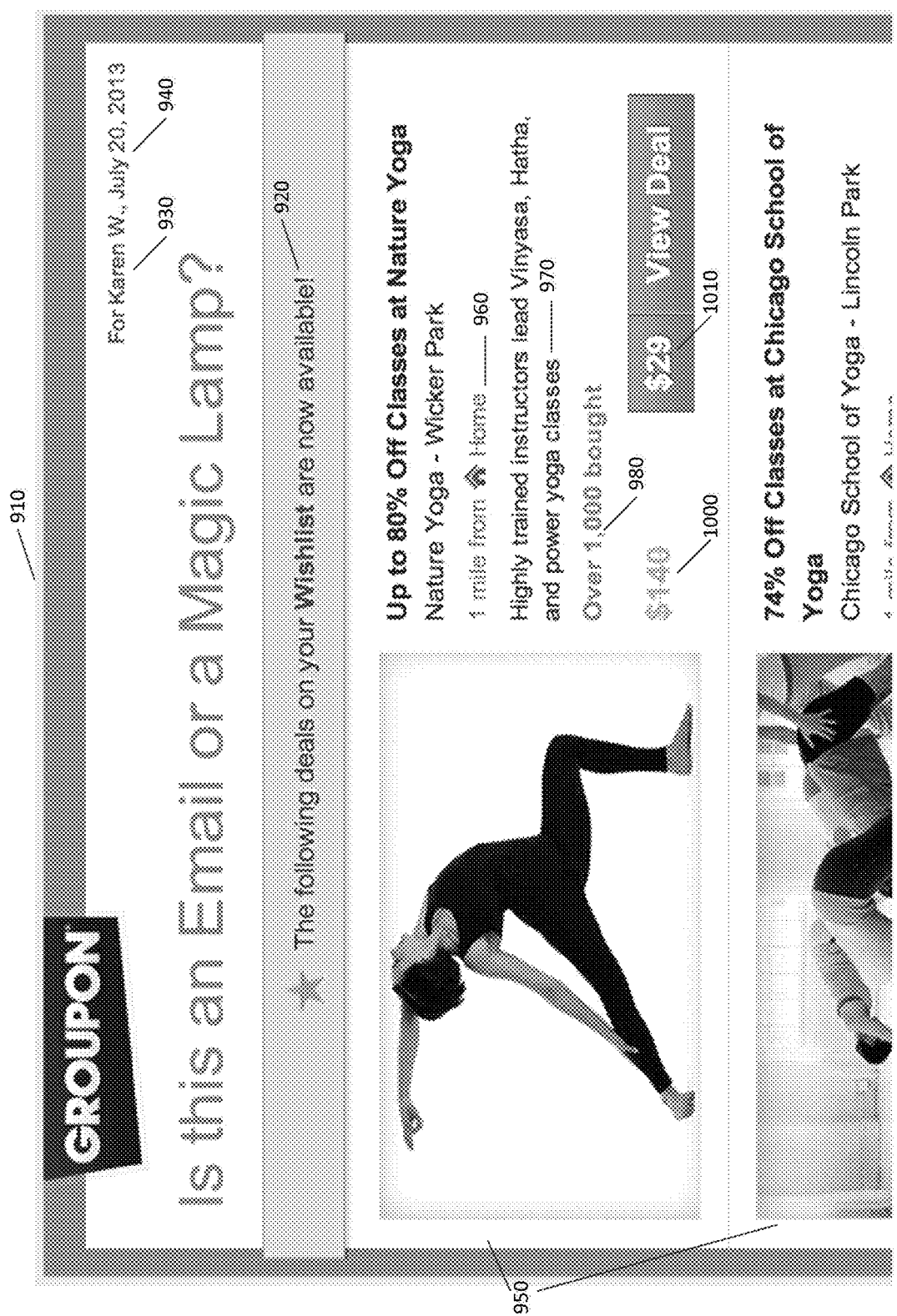
FIG. 9 shows an example graphical user interface display that may be presented by various components of systems in accordance with some example embodiments discussed herein.

FIG. 9 shows an example graphical user interface display 910 that may be used in an example embodiment to notify a consumer when one or more consumer requests are available 920. As can be seen in FIG. 9, a consumer 930 and/or a date 940 the notification is sent may be identified. In some example embodiments, the notification may include a listing of the available promotions 950, such as the promotion shown here for Up to 80% Off Classes at Nature Yoga located in Wicker Park. The notification may include the distance 960 as between a provider and a location, such as "1 mile from Home" as shown. In other example embodiments, the notification may include a description 970 for the promotions, such as "Highly trained instructors lead Vinyasa, Hatha, and power yoga classes" as displayed here. The promotion listed may include an indication of consumer interest 980 by displaying the number of that particular promotion which has been purchased. Here, over 1,000 promotions for Up to 80% Off Classes at Nature Yoga have been purchased. Further, in some embodiments, the promotional value 1000 and/or price 1010 are shown. In an example embodiment, the consumer may view the promotion via a button entitled "View Deal" as illustrated here.

As will be appreciated, any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Embodiments of the present invention have been described above with reference to block diagrams and flowchart illustrations of methods, apparatuses, systems and computer program products. It will be understood that each block of the circuit diagrams and process flowcharts, and combinations of blocks in the circuit diagrams and process flowcharts, respectively, can be implemented by various means including computer program instructions. These computer program instructions may be loaded onto a general purpose computer, special purpose computer, or other programmable data processing apparatus to produce a machine, such that the computer program product includes the instructions, which execute on the computer or other programmable data processing apparatus create a means for implementing the functions specified in the flowchart block or blocks.

These computer program instructions may also be stored in a computer-readable storage device that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein.

Accordingly, blocks of the block diagrams and flowchart illustrations support combinations of means for performing the specified functions, combinations of steps for performing the specified functions and program instruction means for performing the specified functions. With regard to such flowchart illustrations, while various embodiments are described as sequential steps for illustrative purposes, the inventive concepts described herein are not necessarily limited to the sequences illustrated. Indeed, various steps may be performed before or after the other as may be apparent to one of ordinary skill in the art in view of the disclosure. It will also be understood that each block of the circuit diagrams and process flowcharts, and combinations of blocks in the circuit diagrams and process flowcharts, can be implemented by special purpose hardware-based computer systems that perform the specified functions or steps, or combinations of special purpose hardware and computer instructions.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for ascertaining a demand for particular content by utilizing one or more consumer requests for the content that are unable to be fulfilled due to lack of inventory of the content, and subsequently, after adding the content to inventory, and upon determination of inventory able to meet a consumer request for content, providing notification to an original requestor that content subject of a previously unfulfilled consumer request is now able to be fulfilled, the method comprising:

providing, via a user interface, each of one or more promotions, each of the one or more promotion displayed with a link or a selectable button, that when selected provides a search request;

receiving, via the user interface, the search request, the search request being indicative of at least one promotion from among one or more promotions, each promotion being electronic media that upon purchase or acceptance results in a promotional value that, upon redemption, goes toward a least a portion of a purchase of a particular good, service, or experienced defined by the promotion;

performing a search of a promotion database for the at least one promotion;

determining, subsequent to the search of the promotion database, that the at least one promotion from among the one or more promotions is not present in a current inventory and is unavailable for purchase;

subsequently, due to the at least one promotion not being present in the current inventory, both (1) updating, in the promotion database, a consumer specific demand list, the consumer specific demand list comprised of each of one or more requested promotions that (a) were previously searched for, (b) determined not to be present in the current inventory at the time of the previous searching and (c) not yet available in the current inventory, wherein the consumer specific demand list is configured for display, at the user interface, wherein an indication of each of the one or more requested promotions is displayed in conjunction with an associated icon configured to remove the associated requested promotion from the consumer specific demand list, and (2) updating, in the promotion database, an aggregated list of consumer searched promotions, the aggregated list comprising each of one or more requested promotions from each of a plurality of consumers, each of the one or more requested promotions from the plurality of consumers being associated with one geographic location of a plurality of geographic locations;

deriving a total demand for a particular geographic region, for the one or more requested promotions, from the amount of instances that the one or more requested promotions are requested, wherein each of the one or more requested promotions are associated, according to a defined hierarchy or taxonomy, with one or more categories, sub-categories, and services, that identifies a service or product, a price, and at least one geographic region;

ranking, for the particular geographic region, the aggregated list of the at least one of the one or more requested promotions in accordance with the total demand;

generating one or more ranked lists, each specific to the particular geographic region, and each of the one or more ranked lists comprising (1) a portion of the one or more requested promotions for the particular geographic region and (2) a merchant identified as capable of fulfilling at least a portion of the total demand;

subsequent to the generation of the one or more ranked lists, determining an availability of the at least one promotion;

upon the determination of the availability of the at least one promotion, dynamically modifying (1) the consumer specific demand list, in the promotion database, and (2) the one or more previously distributed ranked lists in accordance with updated demand, the dynamic modification comprising removing elements of the ranked list associated with the at least one promotion now determined to be available; and subsequent to the determination of the availability of the at least one promotion, updating display, at the user interface, of the consumer specific demand list to now comprise an icon or link to purchase the at least one promotion, and causing display of a notification, at the user interface, indicating that the at least one promotion associated with the at least one consumer request is available.

2. The method of claim 1, further comprising:
providing an indication, via the user interface, of the at least one promotion or a provider in response to the search request.

3. The method of claim 2, wherein the notification is defined by at least one of a communication, a text message, a link, an icon, or a button.

4. The method of claim 2, wherein the at least one promotion is not returned in response to the search request, the method further comprising prompting a request to add the at least one promotion to the consumer specific demand list.

5. The method of claim 1, wherein the at least one promotion is added to a consumer demand list via at least one of a link, a button, an icon, a request form, a communication, or a text.

6. The method of claim 1, wherein the at least one promotion is added to a consumer demand list via a thumbs up icon.

7. The method of claim 1, wherein generating the aggregated list comprises:
receiving the at least one promotion associated with the consumer request; and
aggregating the at least one promotion and previously requested and unavailable promotions.

8. The method of claim 1, wherein ranking the aggregated list comprises:
assigning a promotion score to each of the one or more requested promotions, the promotion score comprising at least one of a promotion availability score, consumer request score, or a seasonality score; and
generating one or more ranked lists.

9. The method of claim 8, wherein generating the one or more ranked lists comprises:
calculating the promotion score or the provider score assigned to each of the one or more requested promotions; and
ranking each of the at least one of the one or more requested promotions.

10. The method of claim 1, wherein causing the one or more ranked lists to be distributed to the at least one sales resource comprises:
receiving the one or more ranked lists;
allocating the one or more ranked lists to at least one first sales resource; and
deallocating the one or more ranked lists from the at least one first sales resource.

11. The method of claim 10, further comprising:
reallocating the one or more ranked lists to a second sales resource.

12. The method of claim 1, wherein the one or more ranked lists is dynamically allocated to the at least one sales resource based on at least one of current resources, need, or business objectives.

13. The method of claim 1, wherein the one or more ranked lists is dynamically modified based on at least one of a current resource, a need, or a business objective.

14. The method of claim 1, further comprising:
receiving, from a user interface currently displaying an indication of an unavailability of one or more promotions associated with a previous search or browsing activity, a consumer request to be notified upon a later availability of the at least one promotion from among the one or more promotions.

15. The method of claim 1, further comprising:
providing an interface directly to a provider for generating the at least one promotion, individual selections of the interface comprising suggested redemption parameters and a deal structure.

16. An apparatus for ascertaining a demand for particular content by utilizing one or more consumer requests for the content that are unable to be fulfilled due to lack of inventory of the content, and subsequently, after adding the content to inventory, and upon determination of inventory able to meet a consumer request for content, providing notification to an original requestor that content subject of a previously unfulfilled consumer request is now able to be fulfilled, the apparatus comprising at least one processor coupled to at least one memory including computer program code, the at least one memory and the computer program code configured to, with the processor, cause the processor to at least:
provide, via a user interface, each of one or more promotions, each of the one or more promotion displayed with a link or a selectable button, that when selected provides a search request;
receive, via the user interface, the search request, the search request being indicative of at least one promotion from among one or more promotions, each promotion being electronic media that upon purchase or acceptance results in a promotional value that, upon redemption, goes toward a least a portion of a purchase of a particular good, service, or experienced defined by the promotion;
perform a search of a promotion database for the at least one promotion;
determine, subsequent to the search of the promotion database, that the at least one promotion from among the one or more promotions is not present in a current inventory and is unavailable for purchase;
subsequently, due to the at least one promotion not being present in the current inventory, both (1) update, in the promotion database, a consumer specific demand list, the consumer specific demand list comprised of each of one or more requested promotions that (a) were previously searched for, (b) determined not to be present in the current inventory at the time of the previous searching and (c) not yet available in the current inventory, wherein the consumer specific demand list is configured for display, at the user interface, wherein an indication of each of the one or more requested promotions is displayed in conjunction with an associated icon configured to remove the associated requested promotion from the consumer specific demand list, and (2) update, in the promotion database, an aggregated list of consumer searched promotions, the aggregated list comprising each of one or more requested promotions from each of a plurality of consumers, each of the one or more requested promotions from the plurality of consumers being associated with one geographic location of a plurality of geographic locations;
derive a total demand for a particular geographic region, for the one or more requested promotions, from the amount of instances that the one or more requested promotions are requested, wherein each of the one or more requested promotions are associated, according to a defined hierarchy or taxonomy, with one or more categories, sub-categories, and services, that identifies a service or product, a price, and at least one geographic region;

rank, for the particular geographic region, the aggregated list of the at least one of the one or more requested promotions in accordance with the total demand;

generate one or more ranked lists, each specific to the particular geographic region, and each of the one or more ranked lists comprising (1) a portion of the one or more requested promotions for the particular geographic region and (2) a merchant identified as capable of fulfilling at least a portion of the total demand;

subsequent to the generation of the one or more ranked lists, determine an availability of the at least one promotion subsequent to the distribution of the one or more ranked lists;

upon the determination of the availability of the at least one promotion, dynamically modify (1) the consumer specific demand list, in the promotion database, and (2) the one or more previously distributed ranked lists in accordance with updated demand, the dynamic modification comprising removing elements of the ranked list associated with the at least one promotion now determined to be available; and subsequent to the determination of the availability of the at least one promotion, updating display, at the user interface, of the consumer specific demand list to now comprise an icon or link to purchase the at least one promotion, and cause display of a notification, at the user interface, indicating that the at least one promotion associated with the at least one consumer request is available.

17. A computer program product for ascertaining a demand for particular content by utilizing one or more consumer requests for the content that are unable to be fulfilled due to lack of inventory of the content, and subsequently, after adding the content to inventory, and upon determination of inventory able to meet a consumer request for content, providing notification to an original requestor that content subject of a previously unfulfilled consumer request is now able to be fulfilled, the computer program product comprising at least one non-transitory computer-readable storage medium having computer-executable program code instructions stored therein, the computer-executable program code instructions comprising program code instructions that, when executed by at least one processor, cause the at least one processor to:

provide, via a user interface, each of one or more promotions, each of the one or more promotion displayed with a link or a selectable button, that when selected provides a search request;

receive, via the user interface, the search request, the search request being indicative of at least one promotion from among one or more promotions, each promotion being electronic media that upon purchase or acceptance results in a promotional value that, upon redemption, goes toward a least a portion of a purchase of a particular good, service, or experienced defined by the promotion;

perform a search of a promotion database for the at least one promotion;

determine, subsequent to the search of the promotion database, that the at least one promotion from among the one or more promotions is not present in a current inventory and is unavailable for purchase;

subsequently, due to the at least one promotion not being present in the current inventory, both (1) update, in the promotion database, a consumer specific demand list, the consumer specific demand list comprised of each of one or more requested promotions that (a) were previously searched for, (b) determined not to be present in the current inventory at the time of the previous searching and (c) not yet available in the current inventory, wherein the consumer specific demand list is configured for display, at the user interface, wherein an indication of each of the one or more requested promotions is displayed in conjunction with an associated icon configured to remove the associated requested promotion from the consumer specific demand list, and (2) update, in the promotion database, an aggregated list of consumer searched promotions, the aggregated list comprising each of one or more requested promotions from each of a plurality of consumers, each of the one or more requested promotions from the plurality of consumers being associated with one geographic location of a plurality of geographic locations;

derive a total demand for a particular geographic region, for the one or more requested promotions, from the amount of instances that the one or more requested promotions are requested, wherein each of the one or more requested promotions are associated, according to a defined hierarchy or taxonomy, with one or more categories, sub-categories, and services, that identifies a service or product, a price, and at least one geographic region;

rank, for the particular geographic region, the aggregated list of the at least one of the one or more requested promotions in accordance with the total demand;

generate one or more ranked lists, each specific to the particular geographic region, and each of the one or more ranked lists comprising (1) a portion of the one or more requested promotions for the particular geographic region and (2) a merchant identified as capable of fulfilling at least a portion of the total demand;

subsequent to the generation of the one or more ranked lists, determine an availability of the at least one promotion subsequent to the distribution of the one or more ranked lists;

upon the determination of the availability of the at least one promotion, dynamically modify (1) the consumer specific demand list, in the promotion database, and (2) the one or more previously distributed ranked lists in accordance with updated demand, the dynamic modification comprising removing elements of the ranked list associated with the at least one promotion now determined to be available; and subsequent to the determination of the availability of the at least one promotion, updating display, at the user interface, of the consumer specific demand list to now comprise an icon or link to purchase the at least one promotion, and cause display of a notification, at the user interface, indicating that the at least one promotion associated with the at least one consumer request is available.

* * * * *